United States Patent
Abe

(10) Patent No.: US 10,562,352 B2
(45) Date of Patent: Feb. 18, 2020

(54) NON-PNEUMATIC TIRE

(71) Applicant: BRIDGESTONE CORPORATION, Tokyo (JP)

(72) Inventor: Akihiko Abe, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 0 days.

(21) Appl. No.: 15/027,453

(22) PCT Filed: Aug. 12, 2014

(86) PCT No.: PCT/JP2014/071293
§ 371 (c)(1),
(2) Date: Apr. 6, 2016

(87) PCT Pub. No.: WO2015/052989
PCT Pub. Date: Apr. 16, 2015

(65) Prior Publication Data
US 2016/0236514 A1    Aug. 18, 2016

(30) Foreign Application Priority Data

Oct. 10, 2013  (JP) ................................. 2013-213156

(51) Int. Cl.
*B60C 7/14* (2006.01)
*B60C 7/18* (2006.01)
(Continued)

(52) U.S. Cl.
CPC .................. *B60C 7/14* (2013.01); *B60B 9/04* (2013.01); *B60B 9/26* (2013.01); *B60C 7/18* (2013.01);
(Continued)

(58) Field of Classification Search
CPC ........ B60C 2007/107; B60C 2007/146; B60C 7/14; B60C 7/143; B60C 7/18;
(Continued)

(56) References Cited

U.S. PATENT DOCUMENTS

| 976,938 A | 11/1910 | Simpson |
| 1,212,263 A | 1/1917 | Romain |

(Continued)

FOREIGN PATENT DOCUMENTS

| CN | 202413269 U | 9/2012 |
| GB | 190161 A | 1/1923 |

(Continued)

*Primary Examiner* — Scott A Browne
(74) *Attorney, Agent, or Firm* — Sughrue Mion, PLLC

(57) ABSTRACT

In a non-pneumatic tire, a plurality of first to third curved sections (21*d*) to (21*f*) and (22*d*) to (22*f*) curved in a tire circumferential direction are formed at first and second elastic connecting plates (21) and (22) in an extension direction in which the first and second elastic connecting plates extend, in a tire side view when a non-pneumatic tire (1) is seen from a tire width direction (H), curved directions of the first to third curved sections neighboring in the extension direction are opposite to each other, and each of the first and second elastic connecting plates, and inflection sections (21*g*), (21*h*), (22*g*) and (22*h*) disposed between the first to third curved sections neighboring in the extension direction has a smaller cross-sectional area than other portions.

6 Claims, 6 Drawing Sheets

(51) Int. Cl.
*B60B 9/26* (2006.01)
*B60B 9/04* (2006.01)
*B60B 9/00* (2006.01)
*B60B 9/02* (2006.01)

(52) U.S. Cl.
CPC . *B60B 9/00* (2013.01); *B60B 9/02* (2013.01); *B60C 2007/146* (2013.01)

(58) Field of Classification Search
CPC ....... B60B 1/0246; B60B 1/0261; B60B 9/26; B60B 9/00; B60B 9/02; B60B 9/04
See application file for complete search history.

(56) References Cited

U.S. PATENT DOCUMENTS

| | | | |
|---|---|---|---|
| 1,249,273 | A | 12/1917 | Bohannon |
| 1,263,513 | A | 4/1918 | Bem |
| 1,366,450 | A | 1/1921 | Harris |
| 4,527,839 | A * | 7/1985 | Fujitaka .................. B60B 5/02 301/64.704 |
| 9,550,393 | B2 * | 1/2017 | Abe .......................... B60C 7/18 |
| 2013/0048174 | A1 | 2/2013 | Cron |

FOREIGN PATENT DOCUMENTS

| | | | | |
|---|---|---|---|---|
| JP | 4-221201 A | | 8/1992 | |
| JP | 2009-537385 A | | 10/2009 | |
| JP | 2011-156905 A | | 8/2011 | |
| JP | 2011-156906 A | | 8/2011 | |
| JP | 2011156905 A | * | 8/2011 | ............... B60B 5/02 |
| JP | 2011156906 A | * | 8/2011 | ............... B60C 7/14 |
| JP | 2012-6560 A | | 1/2012 | |
| WO | 2008/036789 A2 | | 3/2008 | |
| WO | 2010/012091 A1 | | 2/2010 | |

* cited by examiner

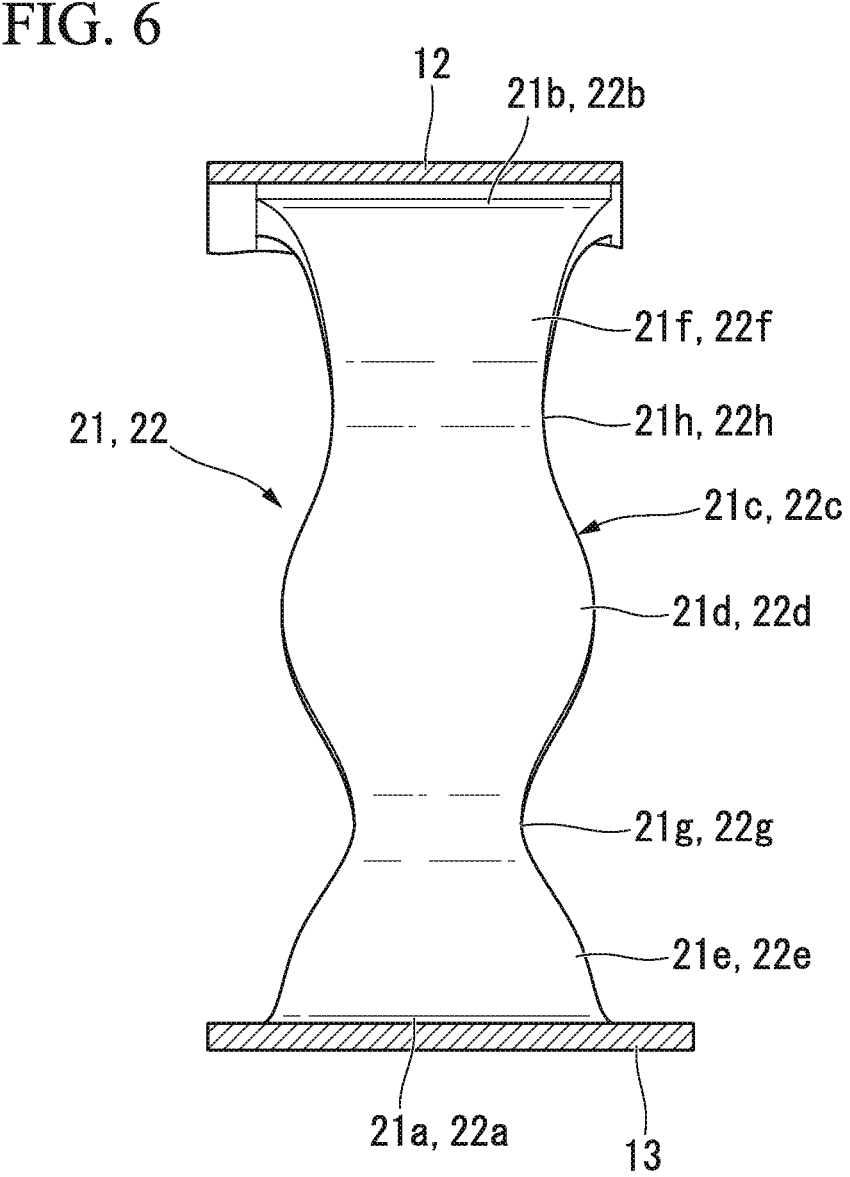

US 10,562,352 B2

NON-PNEUMATIC TIRE

TECHNICAL FIELD

The present invention relates to a non-pneumatic tire that can be used without being filled with pressurized air.

Priority is claimed on Japanese Patent Application No. 2013-213156, filed Oct. 10, 2013, the content of which is incorporated herein by reference.

BACKGROUND ART

In a pneumatic tire of the related art that is filled with pressurized air and used, the occurrence of a blowout is a structurally unavoidable problem.

In order to solve this problem, in recent years, for example, as disclosed in the following Patent Document 1, a non-pneumatic tire including an attachment body attached to an axle, an outer tubular body configured to surround the attachment body from the outside in a tire radial direction, and a connecting member configured to connect together the attachment body and the outer tubular body while allowing displacement therebetween has been proposed.

DOCUMENT OF RELATED ART

Patent Document

[Patent Document 1]
Japanese Unexamined Patent Application, First Publication No. 2011-156905

SUMMARY OF INVENTION

Technical Problem

However, in the non-pneumatic tire of the related art, reduction in weight should be improved more while limiting a decrease in strength of the connecting member.

In consideration of the above-mentioned circumstances, the present invention is directed to provide a non-pneumatic tire capable of reducing weight while limiting a decrease in strength of a connecting member.

Solution to Problem

A non-pneumatic tire of the present invention includes an attachment body attached to an axle; an outer tubular body configured to surround the attachment body from the outside in a tire radial direction; and a connecting member configured to connect together the attachment body and the outer tubular body while allowing displacement therebetween, the connecting member including an elastic connecting plate having both end portions connected to the attachment body and the outer tubular body, wherein a plurality of curved sections curved in a tire circumferential direction are formed at the elastic connecting plate in an extension direction in which the elastic connecting plate extends, in a tire side view when the non-pneumatic tire is seen in a tire width direction, curved directions of the curved sections neighboring in the extension direction are opposite to each other, and in the elastic connecting plate, an inflection section disposed between the curved sections neighboring in the extension direction has a smaller cross-sectional area than that of another portion.

According to the present invention, since the curved directions of the curved sections neighboring in the extension direction are opposite to each other, when the compressive load in the tire radial direction is applied to the non-pneumatic tire, because the inflection section is not easily deformed but is displaced, and a load applied to the inflection section is suppressed more in the elastic connecting plate than in the other portion.

Additionally, a cross-sectional area of the inflection section is smaller than a cross-sectional area of the other portion except for the inflection section in the elastic connecting plate, and a reduction in weight can be achieved while preventing a decrease in the strength of the connecting member.

Here, a cross-sectional area of the elastic connecting plate may be gradually decreased toward the inflection section in the extension direction.

In this case, a reduction in weight can be effectively achieved while limiting the occurrence of stress concentration in the elastic connecting plate.

In addition, at least one of the length in the tire width direction and the length in the tire circumferential direction in the inflection section of the elastic connecting plate may be smaller than that of another portion.

In this case, a non-pneumatic tire that exhibits the above-mentioned effects can be reliably obtained.

Effects of Invention

According to the present invention, reduction in weight can be achieved while limiting a decrease in the strength of a connecting member.

BRIEF DESCRIPTION OF DRAWINGS

FIG. 6 is a plan view of a portion of the first split case body of FIG. 5 when seen from the second side in a tire circumferential direction, or a plan view of a portion of the second split case body of FIG. 5 when seen from first side in the tire circumferential direction.

DESCRIPTION OF EMBODIMENT

Figure 1:
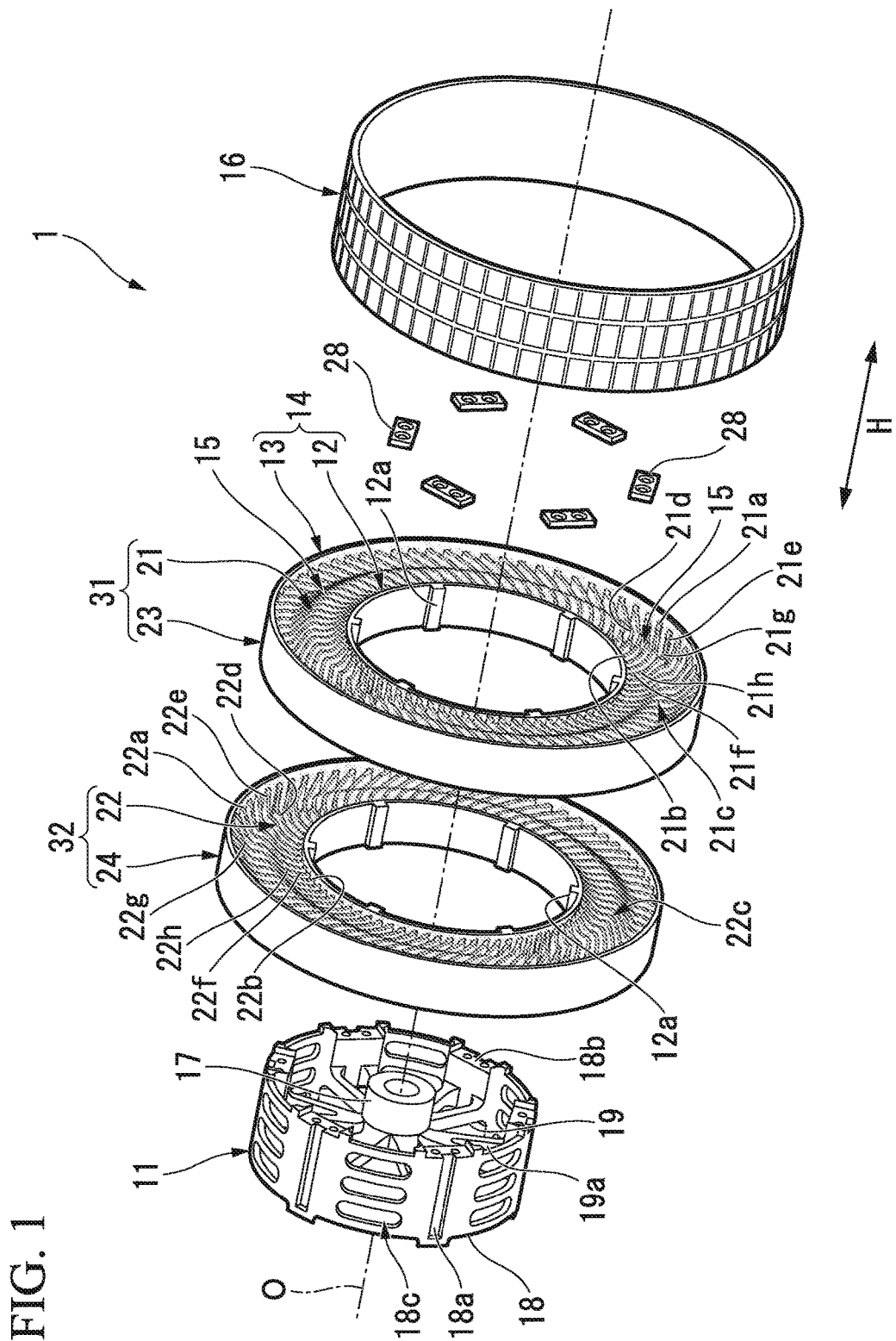
FIG. 1 is an exploded schematic perspective view of a portion of a non-pneumatic tire in an embodiment according to the present invention.

Hereinafter, an embodiment of a non-pneumatic tire according to the present invention will be described with reference to FIGS. 1 to 6.

A non-pneumatic tire 1 includes an attachment body 11 attached to an axle (not shown), a ring member 14 including an inner tubular body 12 fitted onto the attachment body 11 and an outer tubular body 13 configured to surround the inner tubular body 12 from the outside in a tire radial direction, a plurality of connecting members 15 disposed between the inner tubular body 12 and the outer tubular body 13 in a tire circumferential direction and connecting the tubular bodies 12 and 13 to each other while allowing relative elastic displacement therebetween, and a tread member 16 disposed at an outer circumferential surface side of the outer tubular body 13 throughout the circumference.

Here, the attachment body 11, the inner tubular body 12, the outer tubular body 13 and the tread member 16 are disposed coaxially with a common axis. The common axis is referred to as an axis O, a direction along the axis O is referred to as a tire width direction H, a direction perpendicular to the axis O is referred to as a tire radial direction, and a direction around the axis O is referred to as a tire circumferential direction. Further, the attachment body 11, the inner tubular body 12, the outer tubular body 13 and the tread member 16 are disposed such that central portions thereof in the tire width direction H coincide with each other.

In the ring member 14, the length in the tire width direction H, i.e., the width, of the outer tubular body 13 is larger than that of the inner tubular body 12. In addition, a plurality of protrusion sections 12a protruding inward in the tire radial direction and extending throughout the length in the tire width direction H are formed at an inner circumferential surface of the inner tubular body 12 at intervals in the tire circumferential direction.

Figure 2:
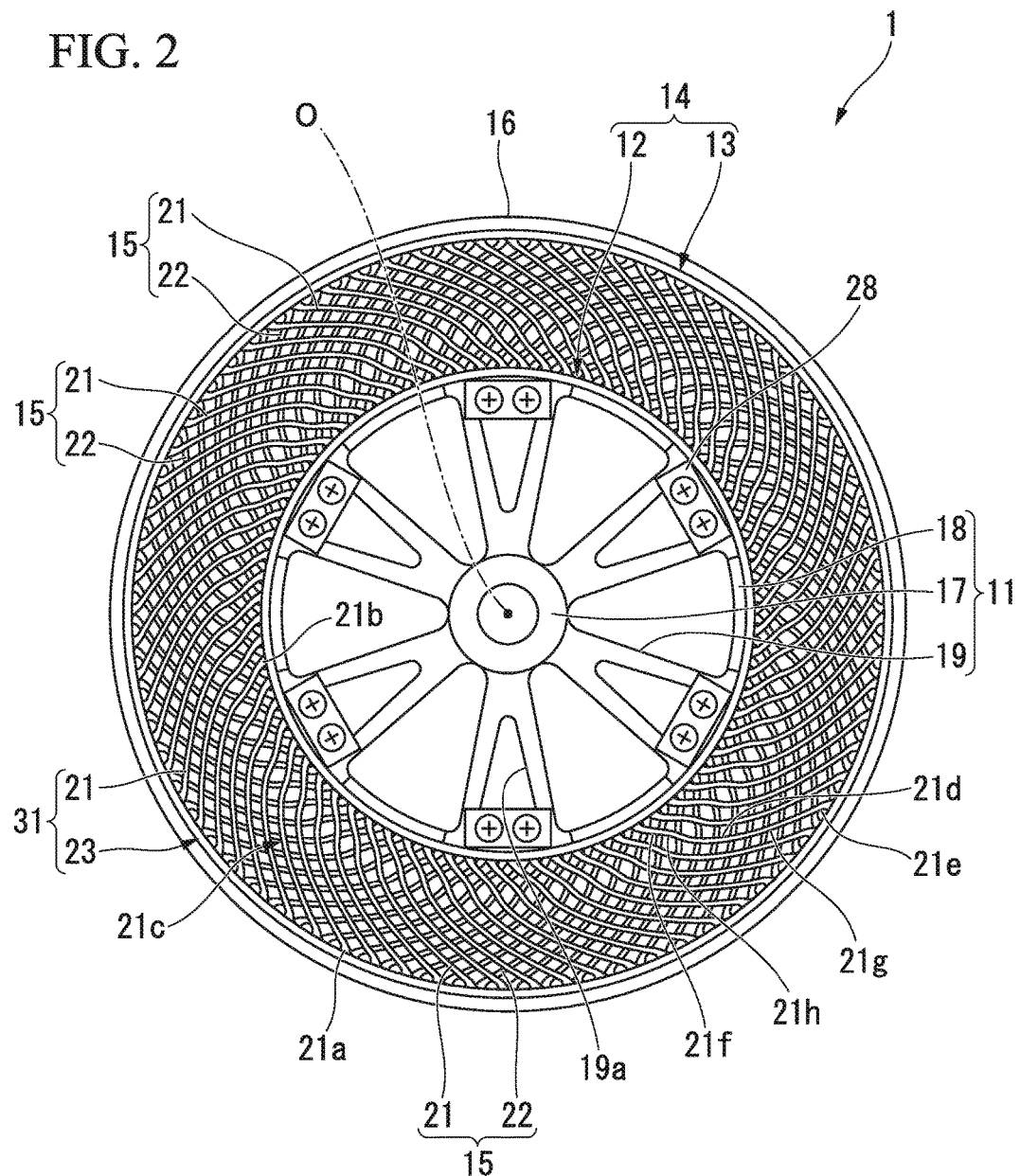
FIG. 2 is a side view of the non-pneumatic tire shown in FIG. 1 when seen from a first side in a tire width direction.

As shown in FIGS. 1 and 2, the attachment body 11 includes a mounting tubular section 17 on which a front end portion of the axle is mounted, an outer ring section 18 configured to surround the mounting tubular section 17 from the outside in the tire radial direction, and a plurality of ribs 19 configured to connect together the mounting tubular section 17 and the outer ring section 18.

The mounting tubular section 17, the outer ring section 18 and the ribs 19 are integrally formed of a metal material such as an aluminum alloy or the like. The mounting tubular section 17 and the outer ring section 18 are cylindrically formed and disposed coaxially with the axis O. The plurality of ribs 19 are disposed at equal intervals in a circumferential direction.

A plurality of key groove sections 18a recessed inward in the tire radial direction and extending in the tire width direction H are formed at an outer circumferential surface of the outer ring section 18 at intervals in the tire circumferential direction. In the outer circumferential surface of the outer ring section 18, each of the key groove sections 18a is opened at only one end out of both ends in the tire width direction H and closed at the other end. The protrusion sections 12a of the inner tubular body 12 in the ring member 14 are fitted into the key groove sections 18a.

Further, among wall surfaces that define the key groove sections 18a, pairs of side wall surfaces opposite to each other in the tire circumferential direction are perpendicular to bottom wall surfaces. In addition, among outer surfaces of the protrusion sections 12a, pairs of side wall surfaces standing up from the inner circumferential surface of the inner tubular body 12 are perpendicular to top wall surfaces directed inward in the tire radial direction. The lengths in the tire circumferential direction of the protrusion sections 12a and the key groove sections 18a are equal to each other.

Here, concave sections 18b recessed toward the second side of the tire width direction H and into which plate members 28 are fitted are formed at positions of edges of first side in the tire width direction H in the outer ring section 18 corresponding to the key groove sections 18a. Through-holes are formed in the plate members 28, and among wall surfaces that define the concave sections 18b, female screw sections in communication with the through-holes of the plate members 28 fitted into the concave sections 18b are formed in the wall surfaces directed toward first side in the tire width direction H. Further, the plurality of female screw sections and through-holes are formed at intervals in the tire circumferential direction.

Then, the ring member 14 is fixed to the attachment body 11 by screwing bolts into the female screw sections through the through-holes of the plate members 28 fitted into the concave sections 18b in a state in which the inner tubular body 12 is fitted onto the attachment body 11 and the protrusion sections 12a are fitted into the key groove sections 18a. In this state, the protrusion sections 12a are sandwiched between the plate members 28 and the other end wall surfaces disposed at the other end in the tire width direction H and directed toward the first side, among the wall surfaces that define the key groove sections 18a, in the tire width direction H.

Further, a plurality of hole arrays 18c, in each of which a plurality of weight-reduction holes passing in the tire radial direction are disposed at intervals in the tire width direction H, are formed in the tire circumferential direction at intervals at portions of the outer ring section 18 disposed between the key groove sections 18a neighboring in the tire circumferential direction. In addition, weight-reduction holes 19a passing in the tire width direction H are also formed in the ribs 19.

The tread member 16 is formed in a cylindrical shape, and integrally coated on the outer circumferential surface of the outer tubular body 13 of the ring member 14 throughout the region. The tread member 16 is formed of, for example, vulcanized rubber in which natural rubber or/and a rubber composition are vulcanized, a thermoplastic material, or the like. For example, a thermoplastic elastomer, a thermoplastic resin, or the like, is an exemplary example of the thermoplastic material. For example, an amide-based thermoplastic elastomer (TPA), an ester-based thermoplastic elastomer (TPC), an olefin-based thermoplastic elastomer (TPO), a styrene-based thermoplastic elastomer (TPS), a urethane-based thermoplastic elastomer (TPU), a thermoplastic rubber crosslinked body (TPV), another thermoplastic elastomer (TPZ), or the like, as defined in Japanese Industrial Standard JIS K6418, is an exemplary example of the thermoplastic elastomer. For example, a urethane resin, an olefin resin, polyvinyl chloride, a polyamide resin, or the like, are exemplary examples of the thermoplastic resin. Further, in view of abrasion resistance, the tread member 16 may be formed of vulcanized rubber.

The connecting members 15 connect the attachment body 11 and the outer tubular body 13 while allowing relative elastic displacement therebetween. The connecting members 15 are connected to the attachment body 11 via the inner tubular body 12. The connecting members 15 include first elastic connecting plates 21 and second elastic connecting plates 22 that are configured to connect the inner tubular body 12 and the outer tubular body 13 of the ring member 14 to each other.

The plurality of (in the example shown, 60) connecting members 15 are formed in the tire circumferential direction such that the plurality of first elastic connecting plates 21 are disposed in the tire circumferential direction at predetermined positions in the tire width direction H and the plurality of second elastic connecting plates 22 are disposed in the tire circumferential direction at other positions in the tire width direction H different from the predetermined positions in the tire width direction H.

That is, the plurality of first elastic connecting plates 21 are disposed in the tire circumferential direction at the same positions in the tire width direction H, and the plurality of second elastic connecting plates 22 are disposed in the tire circumferential direction at the same predetermined positions in the tire width direction H spaced apart from the first elastic connecting plate 21 in the tire width direction H.

Further, the plurality of connecting members 15 are disposed between the inner tubular body 12 and the outer tubular body 13 of the ring member 14 at positions that are axially symmetrical with respect to the axis O. In addition, all of the connecting members 15 have the same shape and the same size. Further, a width of the connecting member 15 is smaller than that of the outer tubular body 13.

Additionally, the first elastic connecting plates 21 neighboring in the tire circumferential direction do not come in contact with each other, and the second elastic connecting plates 22 neighboring in the tire circumferential direction do not come in contact with each other either. Further, the first elastic connecting plates 21 and the second elastic connecting plates 22 neighboring them in the tire width direction H do not come in contact with each other either.

Further, widths of the first elastic connecting plates 21 and the second elastic connecting plates 22 are equal to each other. In addition, thicknesses of the first elastic connecting plates 21 and the second elastic connecting plates 22 are also equal to each other.

Here, first end portions 21a of the first elastic connecting plates 21 connected to the outer tubular body 13 are disposed closer to first side in the tire circumferential direction than the second end portions 21b connected to the inner tubular body 12, and first end portions 22a of the second elastic connecting plates 22 connected to the outer tubular body 13 are disposed closer to the second side in the tire circumferential direction than the second end portions 22b connected to the inner tubular body 12.

In addition, the first end portions 21a and 22a of the first elastic connecting plate 21 and the second elastic connecting plate 22 in each of the connecting members 15 are disposed at different positions in the tire width direction H and connected to the same positions in the tire circumferential direction on the inner circumferential surface of the outer tubular body 13.

In each of the first elastic connecting plates 21 and the second elastic connecting plates 22, a plurality of curved sections 21d to 21f and 22d to 22f curved in the tire circumferential direction are formed at intermediate portions 21c and 22c disposed between the first end portions 21a and 22a and the second end portions 21b and 22b in an extension direction in which the elastic connecting plates 21 and 22 extend, in a tire side view when the tire 1 is seen from the tire width direction H. Further, the curved sections 21d to 21f and 22d to 22f are portions of the first and second elastic connecting plates 21 and 22 having curvatures, respectively, when seen in the tire side view.

In both types of the elastic connecting plates 21 and 22, among the plurality of curved sections 21d to 21f and 22d to 22f, curved directions of the curved sections 21d to 21f and 22d to 22f neighboring in the extension direction are directed in opposite directions.

The plurality of curved sections 21d to 21f formed at the first elastic connecting plates 21 have first curved sections 21d curved to protrude toward the second side in the tire circumferential direction, second curved sections 21e disposed between the first curved sections 21d and the first end portions 21a and curved to protrude toward first side in the tire circumferential direction, and third curved sections 21f disposed between the first curved sections 21d and the second end portions 21b and curved to protrude toward the first side in the tire circumferential direction.

The plurality of curved sections 22d to 22f formed in the second elastic connecting plates 22 have first curved sections 22d curved to protrude toward the first side in the tire circumferential direction, second curved sections 22e disposed between the first curved sections 22d and the first end portions 22a and curved to protrude toward the second side in the tire circumferential direction, and third curved sections 22f disposed between the first curved sections 22d and the second end portions 22b and curved to protrude toward the second side in the tire circumferential direction.

In the example shown, the first curved sections 21d and 22d have larger radii of curvature in the tire side view than the second curved sections 21e and 22e and the third curved sections 21f and 22f. Further, the first curved sections 21d and 22d are disposed at central portions in the extension direction of the first elastic connecting plates 21 and the second elastic connecting plates 22.

Figure 4:
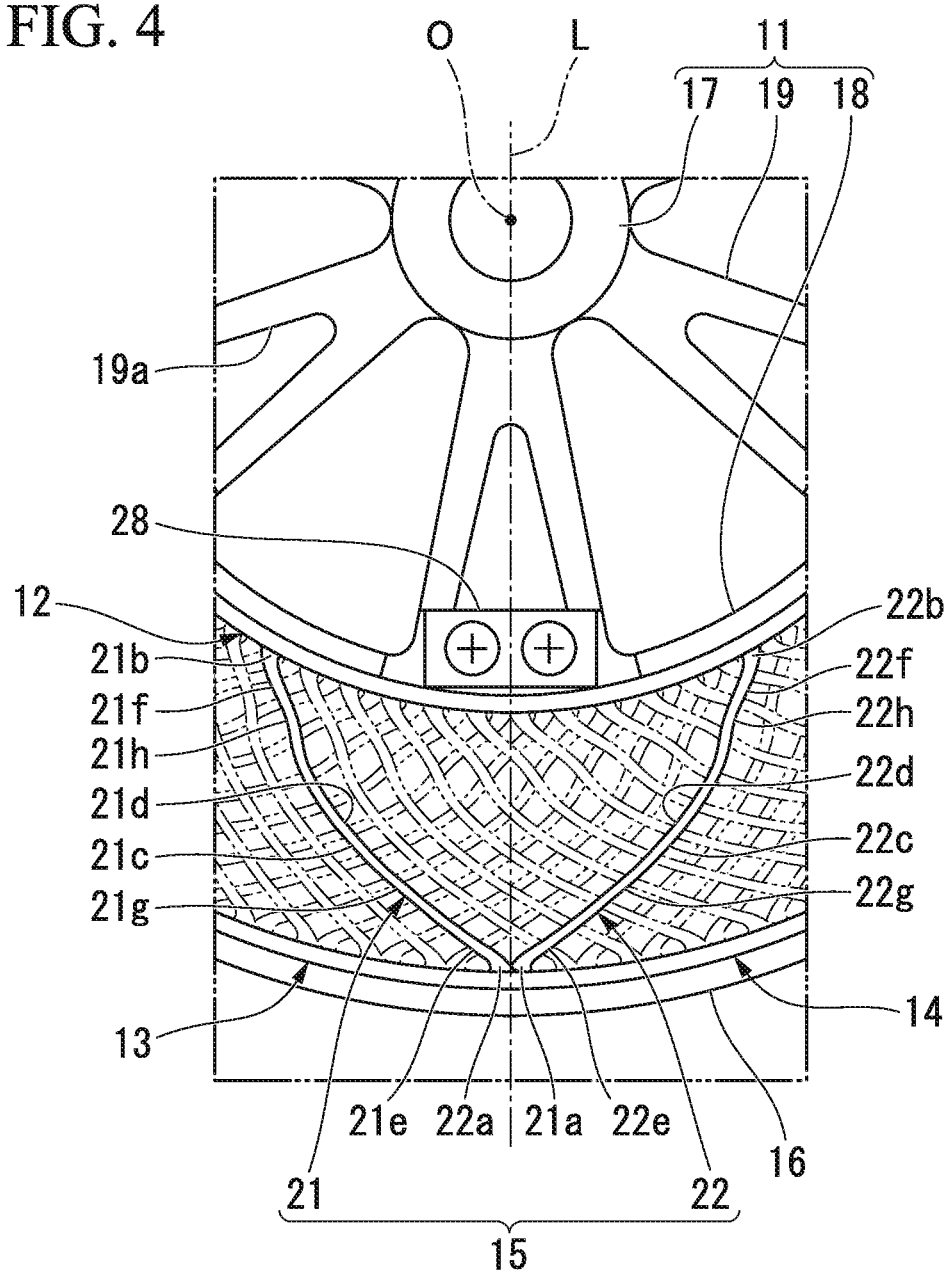
FIG. 4 is an enlarged view showing a major part of FIG. 2.

Further, lengths of both types of the elastic connecting plates 21 and 22 are equal to each other, and as shown in FIG. 4, the second end portions 21b and 22b of both types of the elastic connecting plates 21 and 22 are connected to the first side and the second side on the outer circumferential surface of the inner tubular body 12 in the tire circumferential direction around the axis O from the positions opposite to the first end portions 21a and 22a in the tire radial direction at positions spaced the same angle (for example, 20° to 135°) from each other when seen in the tire side view. In addition, the first curved sections 21d and 22d, the second curved sections 21e and 22e, and the third curved sections 21f and 22f of the first elastic connecting plates 21 and the second elastic connecting plates 22 are directed to protrude in opposite directions in the tire circumferential direction and have the same size.

Accordingly, as shown in FIG. 4, a shape in the tire side view of each of the connecting members 15 is linearly symmetrical with respect to an imaginary line L extending in the tire radial direction and passing through the first end portions 21a and 22a of both types of the elastic connecting plates 21 and 22.

Additionally, in the embodiment, in both types of the elastic connecting plates 21 and 22, an area of a cross section of inflection sections 21g, 21h, 22g and 22h disposed between the curved sections 21d to 21f and 22d to 22f neighboring in the extension direction which is perpendicular to the extension direction, i.e., a cross-sectional area, is smaller than that of the other portions. Further, the inflection sections 21g, 21h, 22g and 22h of both types of the elastic connecting plates 21 and 22 are boundary regions of the curved sections 21d to 21f and 22d to 22f neighboring in the extension direction, and are regions in which curved directions of the curved sections 21d to 21f and 22d to 22f neighboring each other are switched when seen in the tire side view.

In each of the elastic connecting plates 21 and 22, among the plurality of curved sections 21d to 21f and 22d to 22f, curved directions of the curved sections 21d to 21f and 22d to 22f neighboring each other in the extension direction are directed opposite to each other.

In the example shown, cross-sectional areas of both types of the elastic connecting plates 21 and 22 are gradually reduced toward the inflection sections 21g, 21h, 22g and 22h in the extension direction.

In addition, in both types of the elastic connecting plates 21 and 22, the lengths of the inflection sections 21g, 21h, 22g and 22h in both the tire width direction H and the tire circumferential direction are smaller than those of other portions.

As shown in FIG. 6, in both types of the elastic connecting plates 21 and 22, both of edges in the tire width direction H are bent in the tire width direction H to gradually approach each other toward the inflection sections 21g, 21h, 22g and 22h in the extension direction. In addition, both of the edges in the tire width direction H of both types of the elastic connecting plates 21 and 22 are formed in curved shapes that continuously extend with no corners or stepped sections throughout the length in the extension direction. Further, only one out of both of the edges in the tire width direction H in both types of the elastic connecting plates 21 and 22 may be formed in the curved shapes as described above.

The lengths in the tire width direction H of both types of the elastic connecting plates 21 and 22 are gradually reduced toward the inflection sections 21g, 21h, 22g and 22h from the first end portions 21a and 22a and the second end portions 21b and 22b, and gradually reduced from centers in the extension direction of the first curved sections 21d and 22d toward the inflection sections 21g, 21h, 22g and 22h. In addition, the lengths in the tire width direction H of both types of the elastic connecting plates 21 and 22 are equal to each other in the centers of the extension direction of the first end portions 21a and 22a, the second end portions 21b and 22b, and the first curved sections 21d and 22d.

Figure 5:
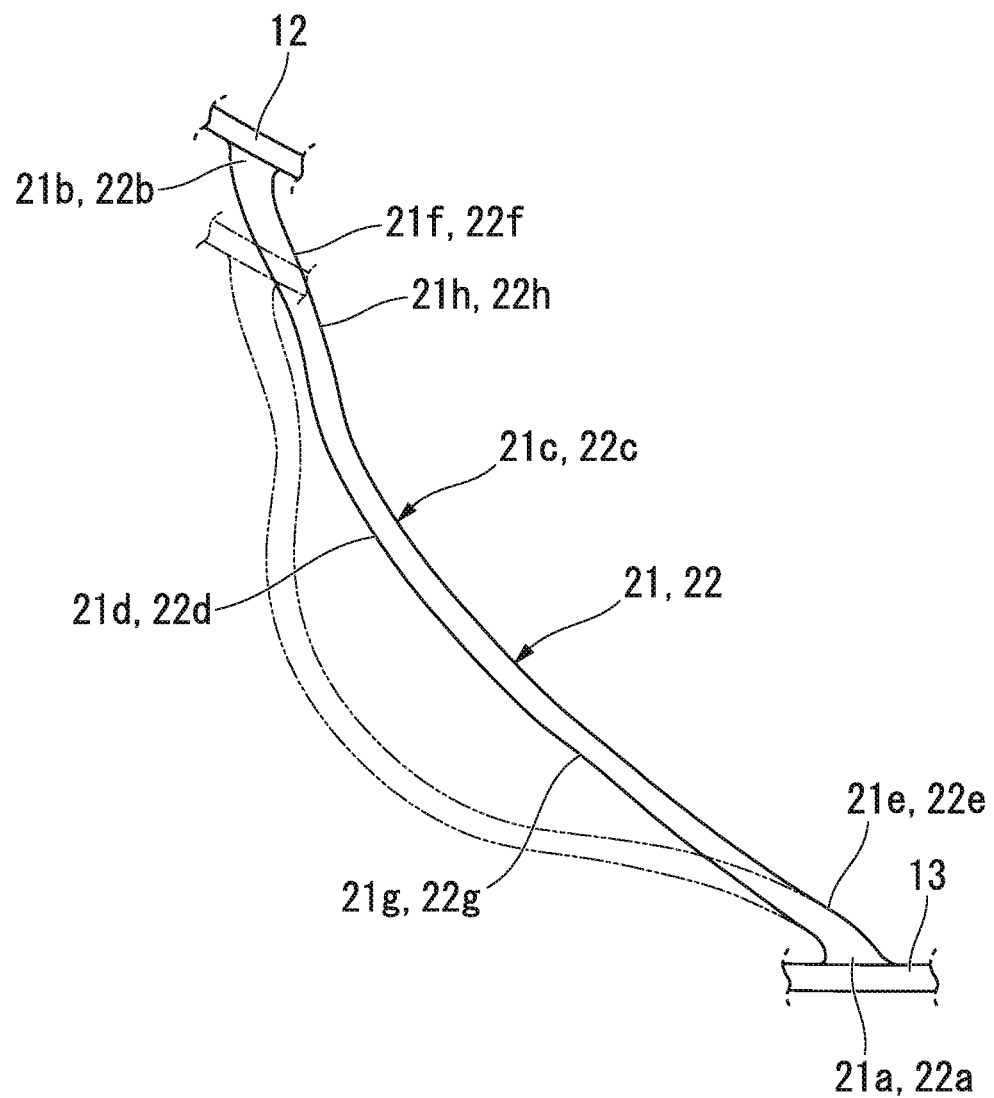
FIG. 5 is an enlarged view showing portions of the first and second split case bodies of FIG. 3.

As shown in FIG. 5, in both types of the elastic connecting plates 21 and 22, the lengths in the tire circumferential direction, i.e., thicknesses of the inflection sections 21g, 21h, 22g and 22h, are smallest. In both types of the elastic connecting plates 21 and 22, the thickness of each of the first end portions 21a and 22a and the second end portions 21b and 22b is largest, and then the thicknesses of the first curved sections 21d and 22d are next largest.

The first to third the curved sections 21d to 21f and 22d to 22f and the inflection sections 21g, 21h, 22g and 22h are smoothly connected in the extension direction with no intervening corners or stepped sections in the tire side view.

Here, in the embodiment, the ring member 14 and the plurality of connecting members 15 are integrally formed of a synthetic resin material. Further, the synthetic resin material may be only one kind of resin material, a mixture including two or more kinds of resin materials, or a mixture including one or more kinds of resin materials and one or more kinds of elastomers. Further, the synthetic resin material may include additives such as an anti-oxidant, a plasticizing agent, a filler, a pigment, or the like.

Further, in the embodiment, as shown in FIG. 1, the ring member 14 is split into first split ring member 23 disposed at a first side in the tire width direction H, and a second split ring member 24 disposed at a second side in the tire width direction H. Further, in the example shown, the ring member 14 is split at a central portion in the tire width direction H.

Additionally, the first split ring member 23 is integrally formed with the first elastic connecting plates 21, and the second split ring member 24 is integrally formed with the second elastic connecting plates 22.

Further, in the embodiment, the first split ring member 23 and the first elastic connecting plates 21 are integrally formed by injection molding, and the second split ring member 24 and the second elastic connecting plates 22 are also integrally formed by injection molding.

Hereinafter, a member formed by integrally forming the first split ring member 23 and the first elastic connecting plates 21 is referred to as a first split case body 31, and a member formed by integrally forming the second split ring member 24 and the second elastic connecting plates 22 is referred to as a second split case body 32.

Here, the injection molding may be a general method of simultaneously forming each of the first and second split case bodies 31 and 32 as a whole, or in each of the first and second split case bodies 31 and 32, one of the first and the second split ring members 23 and 24, and the first and second elastic connecting plates 21 and 22 may be formed as an insert part and the other may be formed of insert molding serving as injection molding, or may be formed by so-called two-color formation or the like.

In addition, in each of the first and second split case bodies 31 and 32, the first and the second split ring members 23 and 24, and the first and second elastic connecting plates 21 and 22 may be formed of different materials or may be formed of the same material. Further, the material may be a metal material, a resin material, or the like, or may be a resin material, in particular, a thermoplastic resin, in view of reduction in weight.

Further, when each of the first and second split case bodies 31 and 32 is simultaneously formed by injection molding as a whole, the plurality of protrusion sections 12a formed at the inner tubular body 12 may be a gate portion.

In each of the first and second split case bodies 31 and 32, central portions in the tire width direction H of the first and second elastic connecting plates 21 and 22 coincide with a central portion in the tire width direction H of the outer tubular body 13, and the inner tubular body 12 has a width smaller than that of the outer tubular body 13.

Additionally, edges in the tire width direction H of the outer tubular body 13 of the first split ring member 23 and the outer tubular body 13 of the second split ring member 24 are connected by, for example, welding, fusion, adhesion, or the like. Further, among these, in the case of welding, for example, hot plate welding or the like may be employed.

In addition, edges in the tire width direction H of the inner tubular body 12 of the first split ring member 23 and the inner tubular body 12 of the second split ring member 24 are separated from each other in the tire width direction H. Accordingly, generation of burrs on the inner circumferential surface of the inner tubular body 12 fitted onto the attachment body 11 is prevented.

Figure 3:
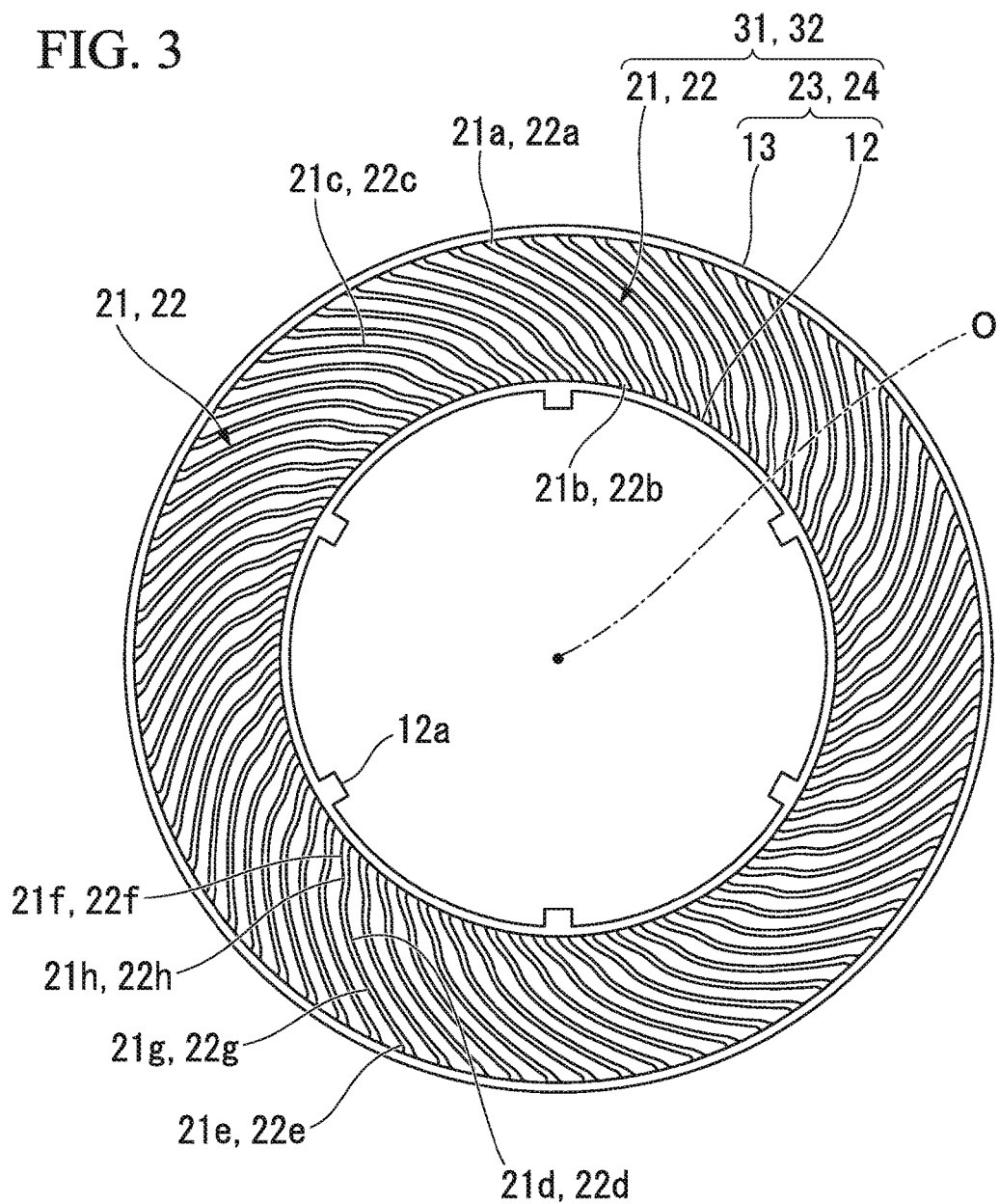
FIG. 3 is a side view of a first split case body when seen from the first side in the tire width direction or a side view of a second split case body when seen from the second side in the tire width direction, in the non-pneumatic tire shown in FIG. 1.

In addition, the first split case body 31 and the second split case body 32 have the same shape and the same size as shown in FIG. 3 in a state before these case bodies 31 and 32 are connected as described above.

Then, when they are connected as described above, the non-pneumatic tire 1 is obtained by butting and connecting the edges in the tire width direction H of the outer tubular bodies 13 of the first split case body 31 and the second split case body 32 such that the connecting members 15 are line-symmetrical as described above in the tire side view, in a state in which orientations in the tire width direction H of both of the split case bodies 31 and 32 are opposite to each other while matching positions in the tire circumferential direction of the first split case body 31 and the second split case body 32.

As described above, according to the non-pneumatic tire 1 of the embodiment, in each of the first and second elastic connecting plates 21 and 22, among the plurality of curved sections 21d to 21f and 22d to 22f, curved directions of the curved sections 21d to 21f and 22d to 22f neighboring in the extension direction are opposite to each other. Accordingly, as shown by a two-dot chain line in FIG. 5, when a compressive load in the tire radial direction is applied to the non-pneumatic tire 1, since the inflection sections 21g, 21h, 22g and 22h are not easily deformed but are mainly displaced, loads applied to the inflection sections 21g, 21h, 22g and 22h are further suppressed in the first and second elastic connecting plates 21 and 22 than in other portions.

Then, since a cross-sectional area of the inflection sections 21g, 21h, 22g and 22h is smaller than a cross-sectional area of a portion other than the inflection sections 21g, 21h, 22g and 22h in each of the first and second elastic connecting plates 21 and 22, reduction in weight can be achieved while preventing a decrease in the strength of the connecting member 15.

In addition, since the cross-sectional area of each of the first and second elastic connecting plates 21 and 22 is gradually reduced toward the inflection sections 21g, 21h, 22g and 22h in the extension direction, reduction in weight can be effectively achieved while limiting an occurrence of a place at which stress is concentrated in the first and second elastic connecting plates 21 and 22.

In addition, since both of the lengths in the tire width direction H of the first and second elastic connecting plates 21 and 22 and the lengths in the tire circumferential direction are smaller than those of the other portions in the inflection sections 21g, 21h, 22g and 22h, a non-pneumatic tire 1 that exhibits the above-mentioned effects can be securely obtained.

Further, the technical scope of the present invention is not limited to the embodiment but various modifications may be added without departing from the spirit of the present invention.

For example, in the embodiment, a configuration including the first elastic connecting plates 21 and the second elastic connecting plates 22 as the connecting members 15 one by one is shown. However, instead of this, a configuration in which a plurality of the first elastic connecting plates 21 and a plurality of the second elastic connecting plates 22 are installed in each of the connecting members 15 at different positions in the tire width direction H may be employed.

In addition, the plurality of connecting members 15 may be installed between the inner tubular body 12 and the outer tubular body 13 in the tire width direction H.

In addition, instead of the embodiment, the second end portions 21b and 22b of the first elastic connecting plates 21 and the second elastic connecting plates 22 may be connected to, for example, positions on the outer circumferential surface of the inner tubular body 12 that are opposite to each other with the axis O interposed therebetween in the tire radial direction, or may be connected to positions on the outer circumferential surface of the inner tubular body 12 that are opposite to the first end portions 21a and 22a of the first elastic connecting plates 21 and the second elastic connecting plates 22 in the tire radial direction, or the like.

In addition, instead of the embodiment, the first end portions 21a and 22a of both types of the elastic connecting plates 21 and 22 may be connected to the inner circumferential surface of the outer tubular body 13 at different positions in the tire circumferential direction.

Further, a gap in the tire width direction H may not be provided between the inner tubular body 12 of the first split ring member 23 and the inner tubular body 12 of the second split ring member 24.

In addition, the ring member 14 may be split into three or more parts in the tire width direction H or may not be split.

In addition, the ring member 14 and the plurality of connecting members 15 may not be integrally formed with each other.

Furthermore, the ring member 14 and the connecting members 15 are not limited to the embodiment. For example, the outer tubular body and the attachment body may be directly connected while allowing relative elastic displacement via the connecting member without the inner tubular body being provided.

In addition, cross-sectional areas of both types of the elastic connecting plates 21 and 22 may be smaller than those of only the inflection sections 21g, 21h, 22g and 22h of both types of the elastic connecting plates 21 and 22.

In addition, in the embodiment, in each of the elastic connecting plates 21 and 22, while both of the length in the tire width direction H and the length in the tire circumferential direction are smaller than those of the other portions in the inflection sections 21g, 21h, 22g and 22h, and only one of these may be smaller.

In addition, in each of the elastic connecting plates 21 and 22, as holes passing in the tire circumferential direction are formed in the inflection sections 21g, 21h, 22g and 22h, the cross-sectional areas in the inflection sections 21g, 21h, 22g and 22h may be smaller than in the other portions.

Further, the components according to the above-mentioned embodiment may be appropriately substituted with known components without departing from the spirit of the present invention, and the above-mentioned variants may be appropriately combined therewith.

In addition, a verification test of the above-mentioned effects was performed.

The non-pneumatic tire 1 shown in FIGS. 1 to 6 was employed as an example, and a non-pneumatic tire in which the length in the tire width direction H in each of the elastic connecting plates 21 and 22 of the non-pneumatic tire 1 of the example was equal to the length of the tire width direction H of the second end portions 21b and 22b throughout the length in the extension direction was employed as a comparative example.

The sizes of both of the non-pneumatic tires were 155/165R15.

Then, compressive forces when the two kinds of non-pneumatic tires were compressed in the tire radial direction and the connecting members were damaged were calculated by numerical analysis.

As a result, it was confirmed that, in comparison with the weight of the non-pneumatic tire of the comparative example, the weight of the non-pneumatic tire 1 of the example was decreased by 10%, and in comparison with the compressive force of the non-pneumatic tire of the comparative example, the compressive force of the non-pneumatic tire 1 of the example was improved by 20%.

INDUSTRIAL APPLICABILITY

The present invention is provided to achieve reduction in weight while limiting a decrease in strength of the connecting member.

DESCRIPTION OF REFERENCE SIGNS

1 Non-pneumatic tire
11 Attachment body
13 Outer tubular body
15 Connecting member
21 First elastic connecting plate
22 Second elastic connecting plate
21a, 22a First end portion
21b, 22b Second end portion
21d, 22d First curved section
21e, 22e Second curved section
21f, 22f Third curved section 21g, 21h, 22g, 22h Inflection section
H Tire width direction

What is claimed is:

1. A non-pneumatic tire comprising:
   an inner tubular body fitted onto an attachment body configured to be attached to an axle;
   an outer tubular body configured to surround the inner tubular body from an outside in a tire radial direction; and
   a plurality of connecting members configured to connect together the inner tubular body and the outer tubular body while allowing displacement therebetween,
   the connecting members comprising an elastic connecting plate connected to the inner tubular body and the outer tubular body,
   wherein the inner tubular body, the outer tubular body and the plurality of connecting members are integrally formed of a synthetic resin material,
   the elastic connecting plate includes a plurality of curved sections curved in a tire circumferential direction and formed in an extension direction in which the elastic connecting plate extends, in a tire side view when the non-pneumatic tire is seen in a tire width direction,
   curved directions of the curved sections neighboring in the extension direction are opposite to each other,
   in the elastic connecting plate, an inflection section disposed between the curved sections neighboring in the extension direction has a smaller cross-sectional area than the curved sections and are mainly displaced when a compressive load in the tire radial direction is applied to the non-pneumatic tire,
   a length in the tire width direction and a thickness in the tire circumferential direction in the inflection section of the elastic connecting plate are smaller than that of the curved sections, and
   the length in the tire width direction and the thickness in the tire circumferential direction in the inflection section of the elastic connecting plate are smaller than that in any other portion of the elastic connecting plate.

2. The non-pneumatic tire according to claim 1, wherein a cross-sectional area of the elastic connecting plate is gradually decreased toward the inflection section in the extension direction.

3. The non-pneumatic tire according to claim 1, further comprising the attachment body, wherein the attachment body includes:
   a mounting tubular section on which a front end portion of the axle is mounted,
   an outer ring section configured to surround the mounting tubular section from outside in the tire radial direction, and
   a plurality of ribs configured to connect together the mounting tubular section and the outer ring section.

4. The non-pneumatic tire according to claim 3, wherein the mounting tubular section, the outer ring section and the ribs are integrally formed of a metal material.

5. The non-pneumatic tire according to claim 3, wherein the mounting tubular section and the outer ring section are cylindrically formed and disposed coaxially with a common axis.

6. The non-pneumatic tire according to claim 3, wherein the plurality of ribs are disposed at equal intervals in a circumferential direction.

* * * * *